United States Patent [19]
Ovshinsky et al.

[11] Patent Number: 5,637,423
[45] Date of Patent: Jun. 10, 1997

[54] COMPOSITIONALLY AND STRUCTURALLY DISORDERED MULTIPHASE NICKEL HYDROXIDE POSITIVE ELECTRODE FOR ALKALINE RECHARGEABLE ELECTROCHEMICAL CELLS

[75] Inventors: Stanford R. Ovshinsky, Bloomfield Hills; Michael A. Fetcenko, Rochester Hills; Srinivasan Venkatesan, Southfield; Arthur Holland, Troy, all of Mich.

[73] Assignee: Ovonic Battery Company, Inc., Troy, Mich.

[21] Appl. No.: 232,782

[22] Filed: Apr. 20, 1994

Related U.S. Application Data

[63] Continuation of Ser. No. 975,031, Nov. 12, 1992, Pat. No. 5,344,728.

[51] Int. Cl.$^6$ .................................................. H01M 4/32
[52] U.S. Cl. .............................. 429/223; 429/94; 429/101
[58] Field of Search .......................... 429/223, 94, 101, 429/206; 204/292, 291, 290 R

[56] References Cited

U.S. PATENT DOCUMENTS

| | | | |
|---|---|---|---|
| 4,064,332 | 12/1977 | Elfwing et al. | 429/223 |
| 4,551,400 | 11/1985 | Sapru et al. | 429/94 |
| 4,623,597 | 11/1986 | Sapru et al. | 429/101 |
| 4,696,875 | 9/1987 | Glemser et al. | 429/206 |
| 4,728,586 | 3/1988 | Venkatesan et al. | 429/94 |
| 4,844,948 | 7/1989 | Nakahori et al. | 429/223 |
| 4,975,035 | 12/1990 | Kuklinski et al. | 429/223 |
| 4,985,318 | 1/1991 | Oshitani et al. | 429/223 |
| 5,096,667 | 3/1992 | Fetcenko | 429/101 |
| 5,132,177 | 7/1992 | Kawano et al. | 429/206 |

*Primary Examiner*—Bruce F. Bell
*Attorney, Agent, or Firm*—Marc J. Luddy; Marvin S. Siskind; David W. Schumaker

[57] ABSTRACT

A positive electrode for use in alkaline rechargeable electrochemical cells comprising: a material comprising a compositionally and structurally disordered multiphase nickel hydroxide host matrix which includes at least one modifier. A process for forming a high loading uniformly distributed multiphase substantially nitrate free sintered positive electrode for use in an alkaline rechargeable electrochemical cell, the process comprising: (1) fabricating sintered electrode material by forming a slurry of nickel powder, water, carboxy methyl cellulose binder, methyl cellulose binder, and a poly(ethylene oxide) polymer; spreading the slurry on a preoxidized perforated nickel substrate; drying the slurry; and sintering the slurry; (2) impregnating the sintered electrode material using multiple impregnation cycles to attain high loading; and (3) forming the impregnated sinter into positive electrode material by presoaking the impregnated sinter in NaOH presoak tanks to substantially eliminate nitrates; brushing the presoaked impregnated sinter in a surface brushing station; charging the brushed impregnated sinter; discharging the charged impregnated sinter; rinsing the discharged impregnated sinter; and drying the rinsed impregnated sinter to complete the formation of positive electrode material.

11 Claims, 3 Drawing Sheets

COMPOSITIONALLY AND STRUCTURALLY DISORDERED MULTIPHASE NICKEL HYDROXIDE POSITIVE ELECTRODE FOR ALKALINE RECHARGEABLE ELECTROCHEMICAL CELLS

This is a continuation of application Ser. No. 07/975,031 filed Nov. 12, 1992, now U.S. Pat. No. 5,344,728.

FIELD OF THE INVENTION

The present invention relates generally to an optimized nickel hydroxide positive electrode. More specifically, this invention relates to optimized nickel hydroxide positive electrodes for rechargeable alkaline cells.

BACKGROUND OF THE INVENTION

In rechargeable alkaline cells, weight and portability are important considerations. It is also advantageous for rechargeable alkaline cells to have long operating lives without the necessity of periodic maintenance. Rechargeable alkaline cells may be used as direct replacements for primary AA, C, and D cells in numerous consumer devices such as calculators, portable radios, and cellular phones. They are often configured into a sealed power pack that is designed as an integral part of a specific device. Rechargeable alkaline cells can also be configured as larger cells that can be used, for example, in industrial, aerospace, and electric vehicle applications.

The best rechargeable alkaline cells are ones that can operate as an "install and forget" power source. With the exception of periodic charging, a rechargeable alkaline cell should perform without attention and should not become a limiting factor in the life of the device it powers.

There are two basic types of rechargeable alkaline cells: nickel cadmium ("NiCd") cells and nickel metal hydride ("Ni—MH") cells.

In a NiCd cell, cadmium metal is the active material in the negative electrode. NiCd cells use a positive electrode of nickel hydroxide material. The negative and positive electrodes are spaced apart in the alkaline electrolyte.

Upon application of an electrical potential across the materials of a NiCd cell, the negative electrode undergoes to the following reaction:

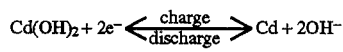

During discharge, this reaction is reversed, Cd is oxidized to Cd(OH)$_2$ and electrons are released. The reactions that take place at the positive electrode of a Ni—Cd cell are also reversible. For example, the reactions at a nickel hydroxide positive electrode in a nickel cadmium cell are:

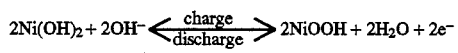

In general, Ni—MH cells utilize a negative electrode that is capable of the reversible electrochemical storage of hydrogen. Ni—MH cells usually employ a positive electrode of nickel hydroxide material. The negative and positive electrodes are spaced apart in the alkaline electrolyte.

Upon application of an electrical potential across a Ni—MH cell, the Ni—MH material of the negative electrode is charged by the electrochemical absorption of hydrogen and the electrochemical generation of hydroxyl ions:

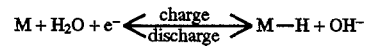

The negative electrode reactions are reversible. Upon discharge, the stored hydrogen is released to form a water molecule and evolve an electron.

The reactions that take place at the nickel hydroxide positive electrode of a Ni—MH cell are:

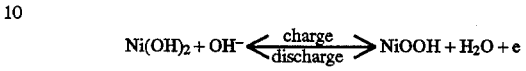

This is the identical reaction that occurs in a NiCd cell.

Ni—MH cells can be further classified as V—Ti—Zr—Ni (Ovonic or AB$_2$) based or AB$_5$ (mischmetal) alloys depending on the type of hydrogen storage material used as the negative electrode. Both types of material are discussed in detail in copending U.S. patent application Ser. No. 07/934,976, now U.S. Pat. No. 5,277,999 to Ovshinsky and Fetcenko, the contents of which are incorporated by reference.

The first hydrogen storage alloys to be investigated as battery electrode materials were TiNi and LaNi$_5$. Many years were spent in studying these simple binary intermetallics because they were known to have the proper hydrogen bond strength for use in electrochemical applications. Despite extensive efforts, however, researchers found these intermetallics to be extremely unstable and of marginal electrochemical value due to a variety of deleterious effects such as slow discharge, oxidation, corrosion, poor kinetics, and poor catalysis. The initial use of these simple alloys for battery applications reflect the traditional bias of battery developers toward the use of single element couples of crystalline materials such as NiCd, NaS, LiMS, ZnBr, NiFe, NiZn, and Pb-acid. In order to improve the electrochemical properties of the binary intermetallics while maintaining the hydrogen storage efficiency, early workers began modifying TiNi and LaNi$_5$ systems.

The modification of TiNi and LaNi$_5$ was initiated by Stanford R. Ovshinsky at Energy Conversion Devices (ECD) of Troy, Mich. Ovshinsky and his team at ECD found that reliance on simple, relatively pure compounds was a major shortcoming of the prior art. Prior work had determined that catalytic action depends on surface reactions at sites of irregularities in the crystal structure. Relatively pure compounds were found to have a relatively low density of hydrogen storage sites, and the type of sites available occurred accidently and were not designed into the bulk of the material. Thus, the efficiency of the storage of hydrogen and the subsequent release of hydrogen to form water was determined to be substantially less than that which would be possible if a greater number and variety of active sites were available.

Ovshinsky had previously found that the number of surface sites could be significantly increased by making an amorphous film that resembled the surface of the desired relatively pure materials. As Ovshinsky explained in *Principles and Applications of Amorphicity, Structural Change, and Optical Information Encoding*, 42 *Journal De Physique* at C4–1096 (Octobre 1981):

> Amorphicity is a generic term referring to lack of X-ray diffraction evidence of long-range periodicity and is not a sufficient description of a material. To understand amorphous materials, there are several important factors to be considered: the type of chemical bonding, the number of bonds generated by the local order, that is its coordination, and the influence of the entire local environment, both chemical and geometrical, upon the resulting varied configurations. Amorphicity is not determined by random packing of atoms viewed as hard spheres nor is the amorphous solid merely a host with atoms imbedded at random. Amorphous materials should be viewed as being composed of an interactive matrix whose electronic configurations are generated by free energy forces and they can be specifically defined by the chemical nature and coordination of the constituent atoms. Utilizing multi-orbital elements and various preparation techniques, one can outwit the normal relaxations that reflect equilibrium conditions and, due to the three-dimensional freedom of the amorphous state, make entirely new types of amorphous materials—chemically modified materials . . .

Once amorphicity was understood as a means of introducing surface sites in a film, it was possible to produce "disorder" that takes into account the entire spectrum of local order effects such as porosity, topology, crystallites, characteristics of sites, and distances between sites. Thus, rather than searching for material modifications that would yield ordered materials having a maximum number of accidently occurring surface irregularities, Ovshinky's team at ECD began constructing "disordered" materials where the desired irregularities were tailor made. See, U.S. Pat. No. 4,623,597, the disclosure of which is incorporated by reference.

The term "disordered," as used herein corresponds to the meaning of the term as used in the literature, such as the following:

A disordered semiconductor can exist in several structural states. This structural factor constitutes a new variable with which the physical properties of the [material]. . . can be controlled. Furthermore, structural disorder opens up the possibility to prepare in a metastable state new compositions and mixtures that far exceed the limits of thermodynamic equilibrium. Hence, we note the following as a further distinguishing feature. In many disordered [materials]. . . it is possible to control the short-range order parameter and thereby achieve drastic changes in the physical properties of these materials, including forcing new coordination numbers for elements . . .

S. R. Ovshinsky, *The Shape of Disorder,* 32 *Journal of Non-Crystalline Solids* at 22 (1979) (emphasis added).

The "short-range order" of these disordered materials are further explained by Ovshinsky in *The Chemical Basis of Amorphicity: Structure and Function,* 26:8–9 *Rev. Roum. Phys.* at 893–903 (1981):

[S]hort-range order is not conserved . . . Indeed, when crystalline symmetry is destroyed, it becomes impossible to retain the same short-range order. The reason for this is that the short-range order is controlled by the force fields of the electron orbitals therefore the environment must be fundamentally different in corresponding crystalline and amorphous solids. In other words, it is the interaction of the local chemical bonds with their surrounding environment which determines the electrical, chemical, and physical properties of the material, and these can never be the same in amorphous materials as they are in crystalline materials . . . The orbital relationships that can exist in three-dimensional space in amorphous but not crystalline materials are the basis for new geometries, many of which are inherently anti-crystalline in nature. Distortion of bonds and displacement of atoms can be an adequate reason to cause amorphicity in single component materials. But to sufficiently understand the amorphicity, one must understand the three-dimensional relationships inherent in the amorphous state, for it is they which generate internal topology incompatible with the translational symmetry of the crystalline lattice . . . What is important in the amorphous state is the fact that one can make an infinity of materials that do not have any crystalline counterparts, and that even the ones that do are similar primarily in chemical composition. The spatial and energetic relationships of these atoms can be entirely different in the amorphous and crystalline forms, even though their chemical elements can be the same . . .

Short-range, or local, order is elaborated on in U.S. Pat. No. 4,520,039 to Ovshinsky, entitled *Compositionally Varied Materials and Method for Synthesizing the Materials,* the contents of which are incorporated by reference. This patent discusses how disordered materials do not require any periodic local order and how, by using Ovshinsky's techniques, spatial and orientational placement of similar or dissimilar atoms or groups of atoms is possible with such increased precision and control of the local configurations that it is possible to produce qualitatively new phenomena. In addition, this patent discusses that the atoms used need not be restricted to "d band" or "f band" atoms, but can be any atom in which the controlled aspects of the interaction with the local environment plays a significant role physically, electrically, or chemically so as to affect the physical properties and hence the functions of the materials. These techniques result in means of synthesizing new materials which are disordered in several different senses simultaneously.

By forming metal hydride alloys from such disordered materials, Ovshinsky and his team were able to greatly increase the reversible hydrogen storage characteristics required for efficient and economical battery applications, and produce batteries having high density energy storage, efficient reversibility, high electrical efficiency, bulk hydrogen storage without structural change or poisoning, long cycle life, and deep discharge capability.

The improved characteristics of these alloys result from tailoring the local chemical order and hence the local structural order by the incorporation of selected modifier elements into a host matrix. Disordered metal hydride alloys have a substantially increased density of catalytically active sites and storage sites compared to conventional ordered materials. These additional sites are responsible for improved efficiency of electrochemical charging/discharging and an increase in electrical energy storage capacity. The nature and number of storage sites can even be designed independently of the catalytically active sites. More specifically, these alloys are tailored to allow storage of hydrogen atoms at bonding strengths within the range of reversibility suitable for use in secondary battery applications.

Based on the pioneering principles described above, a family of extremely efficient electrochemical hydrogen storage materials were formulated. These are the Ti—V—Zr—Ni type active materials such as disclosed in U.S. Pat. No. 4,551,400 ("the '400 Patent") to Sapru, Hong, Fetcenko, and Venkatesan, the disclosure of which are incorporated by reference. These materials reversibly form hydrides in order to store hydrogen. All the materials used in the '400 Patent utilize a generic Ti—V—Ni composition, where at least Ti, V, and Ni are present with at least one or more of Cr, Zr, and Al. The materials of the '400 Patent are generally multiphase materials, which may contain, but are not limited to, one or more phases of Ti—V—Zr—Ni material with $C_{14}$ and $C_{15}$ type crystal structures. Other Ti—V—Zr—Ni alloys may also be used for a rechargeable hydrogen storage negative electrode. One such family of materials are those described in U.S. Pat. No. 4,728,586 ("the '586 Patent") to Venkatesan, Reichman, and Fetcenko for *Enhanced Charge Retention Electrochemical Hydrogen Storage Alloys and an Enhanced Charge Retention Electrochemical Cell*, the disclosure of which is incorporated by reference. The '586 Patent describes a specific sub-class of these Ti—V—Ni—Zr alloys comprising Ti, V, Zr, Ni, and a fifth component, Cr. The '586 patent, mentions the possibility of additives and modifiers beyond the Ti, V, Zr, Ni, and Cr components of the alloys, and generally discusses specific additives and modifiers, the amounts and interactions of these modifiers, and the particular benefits that could be expected from them.

The V—Ti—Zr—Ni family of alloys described in the '586 Patent has an inherently higher discharge rate capability than previously described alloys. This is the result of substantially higher surface areas at the metal/electrolyte interface for electrodes made from the V—Ti—Zr—Ni materials. The surface roughness factor (total surface area divided by geometric surface area) of the V—Ti—Zr—Ni is approximately 10,000. This value indicates a very high surface area. The validity of this value is supported by the inherently high rate capability of these materials.

The characteristic surface roughness of the metal electrolyte interface is a result of the disordered nature of the material. Since all of the constituent elements, as well as many alloys and phases of them, are present throughout the metal, they are also represented at the surfaces and at cracks which form in the metal/electrolyte interface. Thus, the characteristic surface roughness is descriptive of the interaction of the physical and chemical properties of the host metals as well as of the alloys and crystallographic phases of the alloys, in an alkaline environment. These microscopic chemical, physical, and crystallographic parameters of the individual phases within the hydrogen storage alloy material are believed to be important in determining its macroscopic electrochemical characteristics.

In addition to the physical nature of its roughened surface, it has been observed that V—Ti—Zr—Ni metal hydride alloys tend to reach a steady state surface condition and particle size. This steady state surface condition is characterized by a relatively high concentration of metallic nickel. These observations are consistent with a relatively high rate of removal through precipitation of the oxides of titanium and zirconium from the surface and a much lower rate of nickel solubilization. The resultant surface seems to have a higher concentration of nickel than would be expected from the bulk composition of the negative hydrogen storage electrode. Nickel in the metallic state is electrically conductive and catalytic, imparting these properties to the surface. As a result, the surface of the negative hydrogen storage electrode is more catalytic and conductive than if the surface contained a higher concentration of insulating oxides.

The surface of the negative electrode, which has a conductive and catalytic component—the metallic nickel—appears to interact with chromium alloys in catalyzing various hydride and dehydride reaction steps. To a large extent, many electrode processes, including competing electrode processes, are controlled by the presence of chromium in the hydrogen storage alloy material, as disclosed in the '586 Patent.

In contrast to the V—Ti—Zr—Ni based alloys described above, the early $AB_5$ alloys are ordered materials that have a different chemistry and microstructure, and exhibit different electrochemical characteristics compared to the V—Ti—Zr—Ni based alloys. However, recent analysis reveals while the early $AB_5$ alloys may have been ordered materials, more recently developed $AB_5$ alloys are not. The performance of the early ordered $AB_5$ materials was poor. However, as the degree of modification increased (that is as the number and amount of elemental modifiers increased) the materials became disordered, and the performance of the $AB_5$ alloys began to improve significantly. This is due to the disorder contributed by the modifiers as well as their electrical and chemical properties. This evolution of $AB_5$ type alloys from a specific class of "ordered" materials to the current multicomponent, multiphase "disordered" alloys is shown in the following patents: (i) U.S. Pat. No. 3,874,928; (ii) U.S. Pat. No. 4,214,043; (iii) U.S. Pat. No. 4,107,395; (iv) U.S. Pat. No. 4,107,405; (v) U.S. Pat. No. 4,112,199; (vi) U.S. Pat. No. 4,125,688; (vii) U.S. Pat. No. 4,214,043; (viii) U.S. Pat. No. 4,216,274; (ix) U.S. Pat. No. 4,487,817; (x) U.S. Pat. No. 4,605,603; (xii) U.S. Pat. No. 4,696,873; and (xiii) U.S. Pat. No. 4,699,856. (These references are discussed extensively in U.S. Pat. No. 5,096,667 and this discussion is specifically incorporated by reference.)

Simply stated, in the $AB_5$ alloys, like the V—Ti—Zr—Ni metal hydride alloys, as the degree of modification increases, the role of the initially ordered base alloy is of minor importance compared to the properties and disorder attributable to the particular modifiers. In addition, analysis of the current multiple component $AB_5$ alloys indicates that current $AB_5$ alloy systems are modified following the guidelines established for V—Ti—Zr—Ni based systems. Thus, highly modified $AB_5$ alloys are identical to V—Ti—Zr—Ni based alloys in that both are disordered materials that are characterized by multiple-components and multiple phases and there no longer exists any significant distinction between these two types of multicomponent, multiphase alloys.

Rechargeable alkaline cells can be either vented cells or sealed cells. During normal operation, a vented cell typically permits venting of gas to relieve excess pressure as part of the normal operating behavior. In contrast, a sealed cell generally does not permit venting on a regular basis. As a result of this difference, the vent assemblies and the amounts of electrolyte in the cell container relative to the electrode geometry both differ significantly.

Vented cells operate in a "flooded condition." The term "flooded condition" means that the electrodes are completely immersed in, covered by, and wetted by the electrolyte. Thus, such cells are sometimes referred to as "flooded cells." A vented cell is typically designed for very low operating pressures of only a few pounds per square inch after which excess pressures are relieved by a vent mechanism.

In contrast, sealed cells are designed to operate in a "starved" electrolyte configuration, that is with a minimum amount of electrolyte to permit gas recombination. The enclosure for a sealed cell is normally metallic and the cell may be designed for operation at up to approximately 100 p.s.i. absolute or higher. Because they are sealed, such cells do not require periodic maintenance.

Typically, a sealed rechargeable alkaline cell uses a cylindrical nickel-plated steel case as the negative terminal and the cell cover as the positive terminal. An insulator separates the positive cover from the negative cell can. The electrodes are wound to form a compact "jelly roll" with the electrodes of opposite polarity isolated from each other by a porous, woven or non-woven separator of nylon or polypropylene, for example. A tab extend from each electrode to create a single current path through which current is distributed to the entire electrode area during charging and discharging. The tab on each electrode is electrically connected to its respective terminal.

In sealed cells, the discharge capacity of a nickel based positive electrode is limited by the amount of electrolyte, the amount of active material, and the charging efficiencies. The charge capacities of a NiCd negative electrode and a Ni—MH negative electrode are both provided in excess, to maintain the optimum capacity and provide overcharge protection.

The operational lifespan, that is, the available number of charge and discharge cycles of a sealed cell, typically determines the kinds of applications for which a cell will be useful. Cells that are capable of undergoing more cycles have more potential applications. Thus, longer lifespan cells are more desirable.

An additional goal in making any type of electrode is to obtain as high an energy density as possible. For small batteries, the volume of a nickel hydroxide positive electrode is more important than weight and the energy density is usually measured in mAh/cc, or an equivalent unit.

At present, sintered, foamed, or pasted nickel hydroxide positive electrodes are used in NiCd and Ni—MH cells. The process of making sintered electrodes is well known in the art. Conventional sintered electrodes normally have an energy density of around 480–500 mAh/cc. In order to achieve significantly higher loading, the current trend has been away from sintered positive electrodes and toward foamed and pasted electrodes that can be manufactured with an energy density of greater than 550 mAh/cc.

In general, sintered positive electrodes are constructed by applying a nickel powder slurry to a nickel-plated steel base followed by sintering at high temperature. This process causes the individual particles of nickel to weld at their points of contact resulting in a porous material that is approximately 80% open volume and 20% solid metal. This sintered material is then impregnated with active material by soaking it in an acidic solution of nickel nitrate, followed by conversion to nickel hydroxide by reaction with sodium hydroxide. After impregnation, the material is subjected to electrochemical formation in alkaline solution to convert the nickel hydroxide to nickel oxyhydroxide.

In all rechargeable cells using a nickel hydroxide positive electrode, the nickel hydroxide changes back and forth between $Ni(OH)_2$ and $NiOOH$ as the cell is charged and discharged. These reactions involve a significant density change during the charge/discharge reactions. This expansion and contraction causes a "swelling" of the electrode. This swelling is a common cause of failure in cells using a nickel hydroxide positive electrode. Failure occurs because as the positive electrode swells, it absorbs free electrolyte from the separator until the separator dries out.

U.S. Pat. No. 5,077,149, describes a cell system to avoid swelling of the positive electrode. The described cell uses a Ni—MH negative electrode, a nickel hydroxide positive electrode, and a sulfonated, non-woven polypropylene separator all of which contain a zinc compound. The zinc compound prevents electrolyte migration to the positive electrode by facilitating electrolyte retention in the negative electrode and the separator. This reduces the expansion of the positive electrode. This patent states that expansion of the positive electrode causes a change in the electrolyte distribution and an increase in internal resistance, and that the use of zinc oxide in the cell, rather than the fabrication of the electrode is the solution to this problem.

Various "poisons", introduced during the production of the positive electrode or generated during the operation of the cell, can also cause cell failure. For example, residual nitrates and Fe are both known poisons.

Residual nitrates occur during impregnation processes that use nickel nitrate. Unfortunately, even parts per million levels of nitrate can result in undesirable self-discharge mechanisms through the formation of the nitrate shuttle reaction.

In both NiCd and Ni—MH cells, free Fe can be leached from insufficiently plated can or tab connections. In addition, some Ni—MH alloys contain Fe, and these materials oxidize and corrode. Once Fe gets into the aqueous electrolyte solution, it is deposited on the nickel hydroxide and reduces the oxygen overvoltage, effectively, poisoning the positive electrode. A reduction in the oxygen overvoltage means that oxygen evolution will occur at the positive electrode before the positive electrode is fully charged, resulting in a reduction in capacity. It has become standard practice in the Ni—Cd industry to avoid even the smallest Fe impurity in the cell by substituting pure Ni for Fe and by the extensive use of heavy nickel plating. In addition, previously unknown poisoning mechanisms such as deposition or dissolution of metallic species such as oxides of Ti, Zr, or V have been shown to affect the nickel hydroxide electrode in adverse ways such as reduction in capacity, lowered cycle life, and increased self discharge.

In summary, prior art nickel hydroxide positive electrodes have a number of deficiencies that prevent the realization of the full potential of improved Ni—MH negative electrodes. For example, sintered positive electrodes have energy density limitations. In addition, while the use of foamed and pasted electrodes avoid these energy density problems, presently available nickel hydroxide positive electrodes undergo swelling that ultimately results in separator dryout, are susceptible to poisoning, may have poor rate capability, and are susceptible to poisoning.

SUMMARY OF THE INVENTION

One object of the present invention is a sintered nickel hydroxide positive electrode having an energy density of $\geq 560$ mAh/cc.

Another object of the present invention is a nickel hydroxide positive electrode that is resistant to swelling.

Yet another object of the present invention is a nickel hydroxide positive electrode that is resistant to poisoning.

These and other objects of the present invention are satisfied by a positive electrode for use in alkaline rechargeable electrochemical cells comprising: a material comprising a compositionally and structurally disordered multiphase nickel hydroxide host matrix which includes at least one modifier, preferable three modifiers, chosen from the group consisting of F, Li, Na, K, Mg, Ba, Ln, Se, Nd, Pr, Y, Co, Zn, Al, Cr, Mn, Fe, Cu, Zn, Sc, Sn, Sb, Te, Bi, Ru, and Pb.

Other objects of the present invention are satisfied by a positive electrode for use in rechargeable electrochemical cells comprising a sintered nickel hydroxide electrode lacking cadmium and having an energy density of $\geq 560$ mAh/cc, and a cycle life of $\geq 500$ cycles.

Still other objects of the invention are satisfied by a positive electrode for use in alkaline rechargeable electrochemical cells, said positive electrode lacking cadmium, having an energy density of $\geq 560$ mAh/cc, having a self discharge in a sealed Ni—MH cell of $\leq 30\%$ in 30 days at 20° C., and having residual nitrates present in an amount less than 200 ppm.

Additional objects of the invention are satisfied by a positive electrode for use with V—Ti—Zr—Ni metal hydride alloy rechargeable electrochemical cells comprising a sintered nickel hydroxide electrode lacking cadmium and having an energy density of $\geq 560$ mAh/cc, a cycle life of $\geq 500$ cycles, and a self discharge in a sealed Ni—MH cell of $\leq 30\%$ in 30 days at 20° C.

Objects of the invention are also satisfied by a sintered positive electrode for use in alkaline rechargeable electrochemical cells comprising: a nickel substrate that is preoxidized and perforated; a nickel sinter having pores and an outer surface on said nickel substrate; and nickel hydroxide and cobalt hydroxide precipitate in said pores and on said outer surface; where said sintered positive electrode contains <200 ppm residual nitrates, has an energy density of $\geq 560$ Ah/cc, has a self discharge in a sealed Ni—MH cell of $\leq 30\%$ in 30 days at 20° C., and lacks Cd.

Objects of the present invention are also satisfied by a process for fabricating sintered electrode material from which a sintered positive electrode for use in an alkaline rechargeable electrochemical cell can be produced, said process comprising: forming a slurry of nickel powder, water, carboxy methyl cellulose binder, methyl cellulose binder, and a poly(ethylene oxide) polymer; spreading said slurry on a preoxidized perforated nickel substrate; drying said slurry; and sintering said slurry.

Yet other objects of the invention are satisfied by a process for impregnating sintered electrode material from which a high loading uniformly distributed multiphase substantially nitrate free sintered positive electrode for use in an alkaline rechargeable electrochemical cell can be produced, said process comprising: impregnating said sintered electrode material using from multiple impregnation cycles to attain high loading, where each impregnation cycle comprises the steps of: placing said sintered electrode material on a rack; dipping said rack into nickel nitrate; allowing said rack to drip dry; dipping said dried rack into NaOH solution; spraying said rack in a first tank with deionized water overflowing from a second tank; dipping said rack in said second tank filled with deionized water overflowing from a third tank; dipping said rack in said third tank filling with deionized water at a rate of 8–10 gpm; drying said rack; and flipping said rack to attain uniform deposition of material; where in the median dip cycle and in the final dip cycle of said multiple impregnation cycles, said step of dipping said rack into nickel nitrate is replaced by a step of dipping said rack into cobalt nitrate.

The objects of the present invention are also satisfied by a process for forming a high loading uniformly distributed multiphase substantially nitrate free sintered positive electrode for use in an alkaline rechargeable electrochemical cell, said process comprising: (1) fabricating sintered electrode material by forming a slurry of nickel powder, water, carboxy methyl cellulose binder, methyl cellulose binder, and a poly(ethylene oxide) polymer; spreading said slurry on a preoxidized perforated nickel substrate; drying said slurry; and sintering said slurry; (2) impregnating said sintered electrode material using multiple impregnation cycles to attain high loading, where each impregnation cycle comprises the steps of: placing said sintered electrode material on a rack; dipping said rack into nickel nitrate; allowing said rack to drip dry; dipping said dried rack into NaOH solution; spraying said rack in a first tank with deionized water overflowing from a second tank; dipping said rack in said second tank filled with deionized water overflowing from a third tank; dipping said rack in said third tank filling with deionized water at a rate of 8–10 gpm; drying said rack; and flipping said rack to attain uniform, deposition of material; where in the median dip cycle and in the final dip cycle of said multiple impregnation cycles, said step of dipping said rack into nickel nitrate is replaced by a step of dipping said rack into cobalt nitrate to produce an enriched cobalt surface; and (3) forming said impregnated sinter into positive electrode material by presoaking said impregnated sinter in NaOH presoak tanks to substantially eliminate nitrates; brushing the presoaked impregnated sinter in a surface brushing station; charging the brushed impregnated sinter; discharging the charged impregnated sinter; rinsing the discharged impregnated sinter; and drying said rinsed impregnated sinter to complete the formation of positive electrode material.

DETAILED DESCRIPTION OF THE INVENTION

Figure 1:
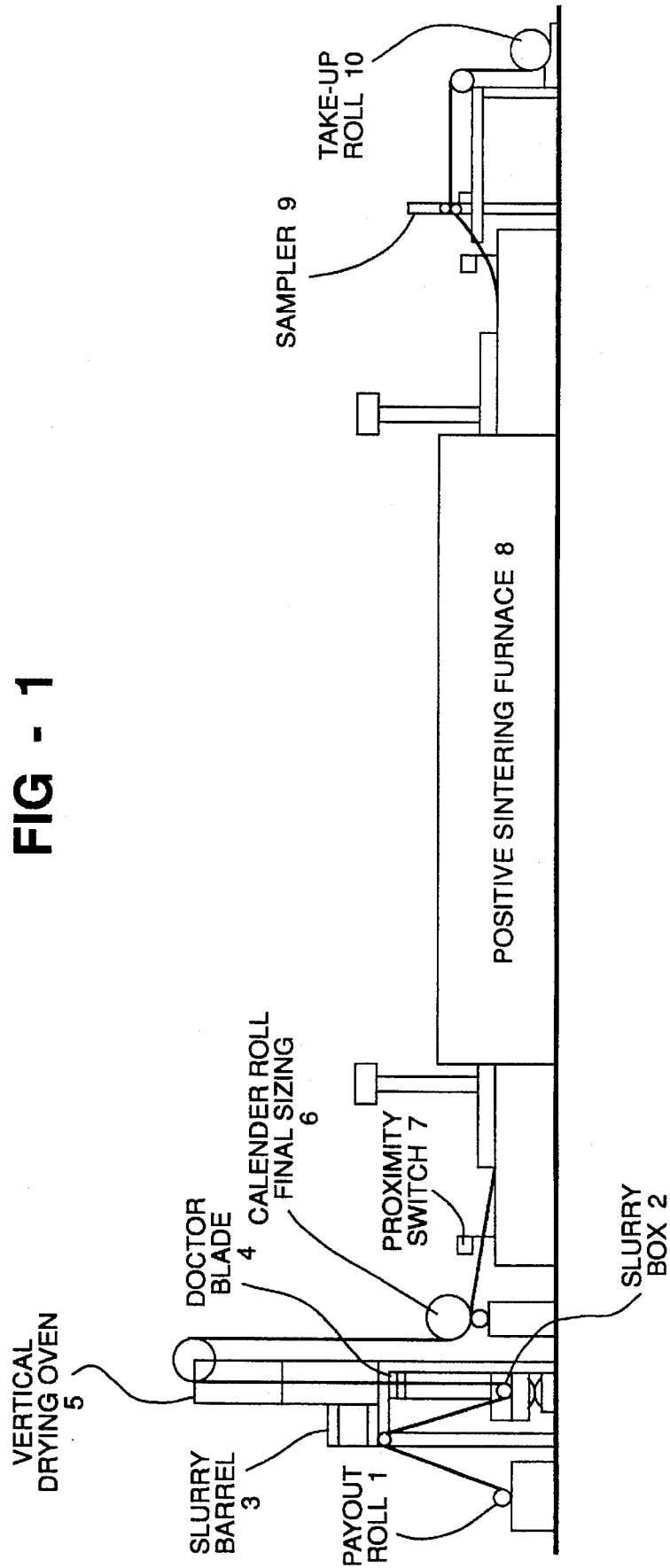
FIG. 1 is a cross sectional representation of the sintering line.

A sintered positive electrode of the present invention embodies a new kind of active material, that has a energy capacity equivalent to foamed or pasted electrodes that have a porosity of 90% or greater, in addition the active material of the present invention has a lower concentration of residual nitrates, and a greater resistance to poisoning than prior art materials.

It is well known that Ni—MH negative electrode material is a much more efficient storage medium than nickel cadmium negative electrode material. This makes it possible to decrease the thickness of the negative electrode by 50% in a Ni—MH cell compared to a Ni—Cd cell and increase the thickness of the positive electrode in a Ni—MH cell by 50%. So, instead of two electrodes that are approximately 0.025" thick in a conventional C size Ni—Cd cell, Ni—MH cells have a 0.038" thick positive electrode and a 0.012" thick negative electrode.

In order to make a thicker nickel hydroxide positive electrode; the present inventors discovered that the viscosity of the slurry mixture used to prepare the nickel sinter structure must be much higher than conventionally used in the Ni—Cd industry. A standard slurry for preparing a nickel sinter structure for use in Ni—Cd cells has a viscosity of approximately 40,000 centipoise ("cp"). For a final electrode thickness of 0.025", the slurry is initially applied at a thickness of approximately 0.05" followed by drying and sintering where the final thickness is reduced by approximately 50% or 0.025". After the slurry is applied to the substrate via a doctor blade apparatus, the coated substrate is passed through a vertical drying tower, which is usually followed by a horizontal sintering operation.

To make a 50% thicker final electrode, the coating of the slurry onto the substrate must be almost 0.090". This thickness is beyond the capability of conventional slurries in that the normal viscosity is far too low to avoid sagging, running, and other imperfections as the coated substrate enters a vertical drying tower. To correct this problem, the present invention involves a substantial increase in slurry viscosity from 40,000 cp to approximately 72–75,000 cp. This higher viscosity allows a much thicker coating of the slurry without the problems discussed above.

In addition to making a substantially thicker electrode than conventional nickel hydroxide electrodes, the present inventors discovered that it is also desirable to make a nickel hydroxide electrode that has higher capacity than previously known. Conventional sintered nickel hydroxide electrodes have a base sinter structure that is approximately 80% porous. Conventional thinking was that to make a higher capacity electrode, it was necessary to make the nickel sinter even more porous, up to as high as 90%. Because 90% porous material that is sintered is much more fragile and prone to swelling, the industry trend has been to develop foamed and pasted structures of 90% porosity.

In fact, many companies have developed pasted nickel hydroxide electrodes utilizing foam metal or fiber metal substrates having 90% porosity. Active material is usually applied by pasting techniques using special active materials. The desired objective in using these pasted materials was primarily an increase in energy density from approximately 500 mAh/cc for standard sintered structures to over 550 mAh/cc.

The trend toward foamed metal substrate electrodes away from sintered electrodes has advantages as well as disadvantages. The primary motivating factors for foam metal substrate electrodes was a desire to have a higher energy density than standard sintered electrodes, to lower the cost in high production volumes, and to simplify processing. On the other hand, a great number of problems exist which have still not been fully addressed. The major problem with pasted electrodes that has not been resolved is that pasted electrodes generally have a low cycle life and poor power capability. The more porous structure is weak and very prone to swelling resulting in electrolyte redistribution problems in a sealed cell which shortens the cell's life. In addition, the higher porosity structure is also less conductive and the distance between active material and current collection is usually increased. Both problems, swelling and reduced conductivity, have led to the development of very special active materials such as high density spherical nickel hydroxide. Intensive efforts are made to achieve high density in order to achieve a high final electrode capacity. In addition, special formulations of active material are utilized to reduce swelling. However, these electrodes are very costly due to the fact that the foam metal substrate and the high density nickel hydroxide are expensive to produce.

Consequently, a sintered positive electrode having comparable energy storage capacity to pasted foam electrodes without reduced power and cycle life is very desirable.

Quite unexpectedly, the present inventors found that there was an abundant amount of active material present in a conventional nickel hydroxide positive electrode, but that it was not fully utilized. In forming a sintered electrode, nickel powder is sintered to form an electrical and physical skeleton. Nickel hydroxide is deposited on this skeleton in an impregnation process to form an electrically conductive matrix. The present inventors found that in the nickel powder skeleton, pores greater than approximately 30 microns in diameter could not fully utilize the nickel hydroxide active material and that in conventional nickel hydroxide positive electrodes, many of the pores were from 40–80 microns in diameter. With this discovery, the present inventors realized that impregnation of more active material was not as important as effectively utilizing the active material that was already present. The sintered electrodes of the present invention predominantly limit pore size to approximately 30 microns in size, therefore, they have greater capacity even though their overall porosity, like that of conventional sintered electrodes, is around 80%.

One step in the construction of conventional sintered nickel hydroxide electrodes involves forming a slurry of nickel and methyl cellulose binder. The present inventors discovered that this simple, single binder slurry is not effective in providing good mixing and subsequent uniform pore size distribution. Methyl cellulose is a relatively inefficient binder and, as a result, the nickel forms clumps and pockets. The resulting sinter, if viewed under a microscope, shows the nickel skeleton to be uneven with many pores of greater than 30 microns in size. The inefficiency of the nickel/methyl cellulose slurry is exacerbated when trying to make a 0.038" thick positive electrode as desired in a Ni—MH cell. In order to get a final thickness of 0.038", it is necessary to doctor blade the nickel slurry onto the substrate in a layer that is approximately 0.090" thick. This is approximately double the thickness of nickel slurry used to produce a conventional nickel hydroxide positive electrode. As previously stated, in order to achieve such a thick electrode, it is necessary to substantially increase the slurry viscosity. The higher viscosity makes the mixing properties of the methyl cellulose even worse. Applying such a thick slurry is extremely difficult because conventionally formulated slurries lack sufficient viscosity to be self-sustaining at this thickness.

The problems associated with prior art slurries are overcome by a unique binder system we have developed. This binder system is formulated by combining a poly(ethylene oxide) polymer, carboxymethyl cellulose, and methyl cellulose with water. This slurry system is preferably formulated using 43–53 wt % nickel, 45–55 wt % water, 0.3–1.3 wt % POLYOX (a trade mark of Union Carbide for poly(ethylene oxide) polymer), 0.1–0.9 wt % carboxymethyl cellulose, and 0.1–0.7 wt % methyl cellulose. Without wishing to be bound by theory, it is believed that this binder system makes it possible to produce higher capacity positive electrodes, because it mediates the even mixing and formation of a homogeneous solution of nickel particles in a slurry that is extremely viscous yet can still be doctor bladed into a uniform layer.

The slurry of the present invention is formulated by first mixing the dry ingredients, the poly(ethylene oxide) polymer, carboxymethyl cellulose, and methyl cellulose with INCO 255° nickel powder (manufactured by the International Nickel Company) for 15 to 60, preferably 30 minutes by tumbling at from 1 to 3, preferably 2 RPM, in a smooth wall container. Water is added to the tumbled mixture and the tumbling resumed at from 1 to 3, preferably 2 RPM until the slurry has a viscosity of from 68,000 Centipoise (cp) to 76,000 cp; and a density of from 1.65 to 1.71 g/cc.

The prepared slurry is doctor bladed onto a preoxidized perforated nickel substrate, followed by drying and sintering. Preoxidized perforated nickel substrate is preferred for two reasons. It has been found that adhesion of the nickel powder is enhanced during sintering by preoxidation. This is important in that delamination of the nickel powder matrix is a common difficulty in the preparation of these materials. It has also been found that the preoxidized material is more immune to corrosion or "acid attack" during impregnation. It is also envisioned that a full range of porous, solid nickel substrates may be used in addition to the perforated nickel substrate specifically described herein.

FIG. 1 illustrates a roll-to-roll machine for doctor blading the slurry of the invention onto a substrate, drying the slurry, and sintering the slurry as a continuous operation. In FIG. 1, preoxidized perforated solid nickel substrate is fed from a payout roll 1 through a slurry box 2. Previously prepared slurry is fed from the slurry barrel 3 into the slurry box 2. The thickness of the slurry on the substrate is determined as the screen moves by the doctor blade 4. The slurry is dried in the vertical drying oven 5 and sized using a calendar roll 6. The sized dry slurry is sintered in a continuous sintering furnace 8, which can have multiple heating zones and cooling zones. Samples for quality control inspection are taken from the resulting sinter formed on the solid nickel substrate in an on line punch press device 9. Tension on the continuous ribbon of sinter as it moves through the machine is maintained through the use of proximity switches such as proximity switch 7 which can be connected through a control device such as a micro computer (not shown) to the payout roll 1 and the take up roll 10.

Other unique aspects of the sintering process are the use of a special doctor blade apparatus which substantially eliminates the formation of "dogbone" shaped edges. It is common for the slurry to be wiped away in strips which can later be utilized as integral tabs for current collection. During the wiping, tremendous hydrostatic pressures are built up causing a spring back effect of the slurry at the outer edges near the wiped areas. The doctor blade apparatus reduces this problem through the use of a tapered or stepped doctoring blade. The problem of "dogboning" is undesirable in that uneven compression can result in the cell unless expensive milling is done, essentially grinding away of material. Another unique solution to this problem is the use of a calendering mill positioned after drying, but before sintering. This allows the "dogbone" to be gently squeezed whereas post sinter calendering can cause a high density of nickel at the surface, inhibiting the penetration of nickel nitrate during impregnation. Finally, it should be noted that an atmosphere of 7% $H_2$ with the balance of $N_2$ at a temperature of approximately 900° C. is used during sintering. This atmosphere is most effective in providing a reducing atmosphere and high strength compared to other gas compositions.

Chemical conversion as a method of impregnating nickel hydroxide into a sinter is well known. However, the chemical conversion of the present invention is unique and not suggested by the prior art. At least one prior art method of impregnating the sinter also had other disadvantages. This method involves dipping the sintered nickel skeleton into the acidic nickel nitrate solution which resulted in tremendous of corrosion of the nickel sinter.

Prior art methods of impregnation were also inappropriate for the purpose of providing high loading of active material in order to achieve the desired high energy density. Frequently, problems of surface loading prevented interior loading of active material, thereby inhibiting the goal of thoroughly loading the available porosity from sintering with active material. Other problems with prior art chemical impregnation involve insufficient drying after nitrate loading and rinsing, which prevents high density nickel hydroxide loading. Still other problems involved too high a level of residual nitrates and carbonate impurities due to insufficient rinsing and purity of the NaOH conversion bath. Other problems with prior art impregnation involved the use of excessive temperatures during drying, causing the creation of electrochemically inactive nickel oxides. Further problems resulted from a failure to compensate for excessive loading variances due to gravity.

Finally, the active material itself is insufficient for use in Ni—MH cells. This problem is in addition to difficulties in producing a thick, highly loaded, high utilization electrode free from excessive impurities, discussed above. Prior art active materials did not have to address the problems of electrochemical formation difficulties due to high loading, poisoning resistance to new unique potential poisons from a V—Ti—Zr—Ni—Fe based alloys, nor the higher sensitivity of Ni—MH cells to self-discharge compared to NiCd cells. Further, electrode charge efficiency, —especially under quick charge conditions had to improve. This is in part due to the fact that practical current densities increase in high energy Ni—MH cells compared to NiCd cells because end users still require ten hours of slow charging and 15 to 60 minutes of fast charging, even though the absolute current required to one-hour charge a 5.0 Ah Ni—MH C size cell is 5.0 Amps compared to a Ni—Cd C size cell where the one hour charge current is only 2–2.4 Amps.

In addition to the difficulties discussed above, problems also arise in the electrochemical formation process. We have observed that conventional prior art formation is totally inadequate in the areas of residual nitrate reduction and activation of the nickel hydroxide to eliminate discharge reserve. Further, we have also learned that the composition of the alkaline electrolyte used in formation, its temperature, the charge and discharge current densities, and the manner of rinsing and drying of the electrode all play important roles in the proper functioning of positive electrodes used in a high performance Ni—MH battery.

Together, these factors illustrate that the sintered nickel hydroxide positive electrodes of the present invention are superior for use in NiCd cells and particularly superior for use in state of the art Ni—MH cells. The inadequacy of prior art sintered nickel hydroxide positive electrodes is underscored by the industry wide movement to foam based pasted positive electrodes in Ni—MH cells as discussed above.

The present invention avoids the problems of the prior art. Rather than using nickel plated steel as the substrate, the present invention uses a preoxidized perforated nickel substrate, as discussed above. This promotes better adhesion of the nickel powder particle to the substrate metal as well as significantly limiting the amount of corrosion that occurs during the impregnation steps. In addition, the sintering process of the invention provides an additional degree of pre-oxidation to the nickel powder particles making them more resistant to corrosion during impregnation.

The impregnation process of the present invention is accomplished using multiple, successive, impregnation cycles.

A further aspect of the unique impregnation process of the present invention is that the positive electrode of the present invention contains a higher percentage of co-precipitated cobalt than do the prior art materials. While the use of co-precipitated cobalt is known, particularly for nickel-cadmium cells, the Co content of these cells is only approximately 1–3%. in contrast, a positive electrode of the present invention contains greater than 6 wt %, preferably 9–10 wt % co-precipitated cobalt.

In the impregnation process of the present invention, the high cobalt content of the positive electrode is further accentuated by the use of a cobalt nitrate dip in the median dip cycle and then again at the final dip cycle. Herein, the phrase "median dip cycle" is used to refer to the dip cycle halfway through the series of successive impregnation cycles and the phrase "final dip cycle" to refer to the dip cycle at the end of the series of successive impregnation cycles. Using the cobalt nitrate median and final dip cycles produces an enriched cobalt surface which provides better conductivity, poisoning resistance, and suppresses $O_2$ evolution.

Without wishing to be bound by theory, it is believed that the final cobalt nitrate dip in the impregnation process also result in surface enriched cobalt. The median dip cycle is believed to improve utilization and accelerate activation by increasing the overall conductivity of the aggregate active material. The outer surface is critical for poisoning resistance. In reality this means that while the composition of cobalt in the active material is greater than 6 wt %, preferably 9–10 wt %, the concentration of cobalt hydroxide on the surface of the electrode is much higher.

Cobalt hydroxide is more resistant to poisoning than pure nickel hydroxide. The use of the described concentration of pure cobalt hydroxide and a higher concentration of the co-precipitated cobalt is crucial for use in V—Ti—Zr—Ni metal hydride alloy based Ni—MH batteries. Another unique aspect of the materials of the present invention believed to result from this unique impregnation and formation process is that the finished electrode has a very low concentration of residual nitrates. Residual nitrates result primarily because the impregnation cycles of the impregnation process use nickel nitrate or cobalt nitrate that are converted into their respective hydroxides as described in detail below. In the prior art, the conversion of nitrates into hydroxides was much less than 100% efficient and, as a result, some nickel nitrate was locked into the matrix of the finished positive electrode materials. In the present invention, the impregnation process is significantly more efficient which results in a reduction of the residual nitrate to no more than 200 ppm, maximum.

Figure 2:
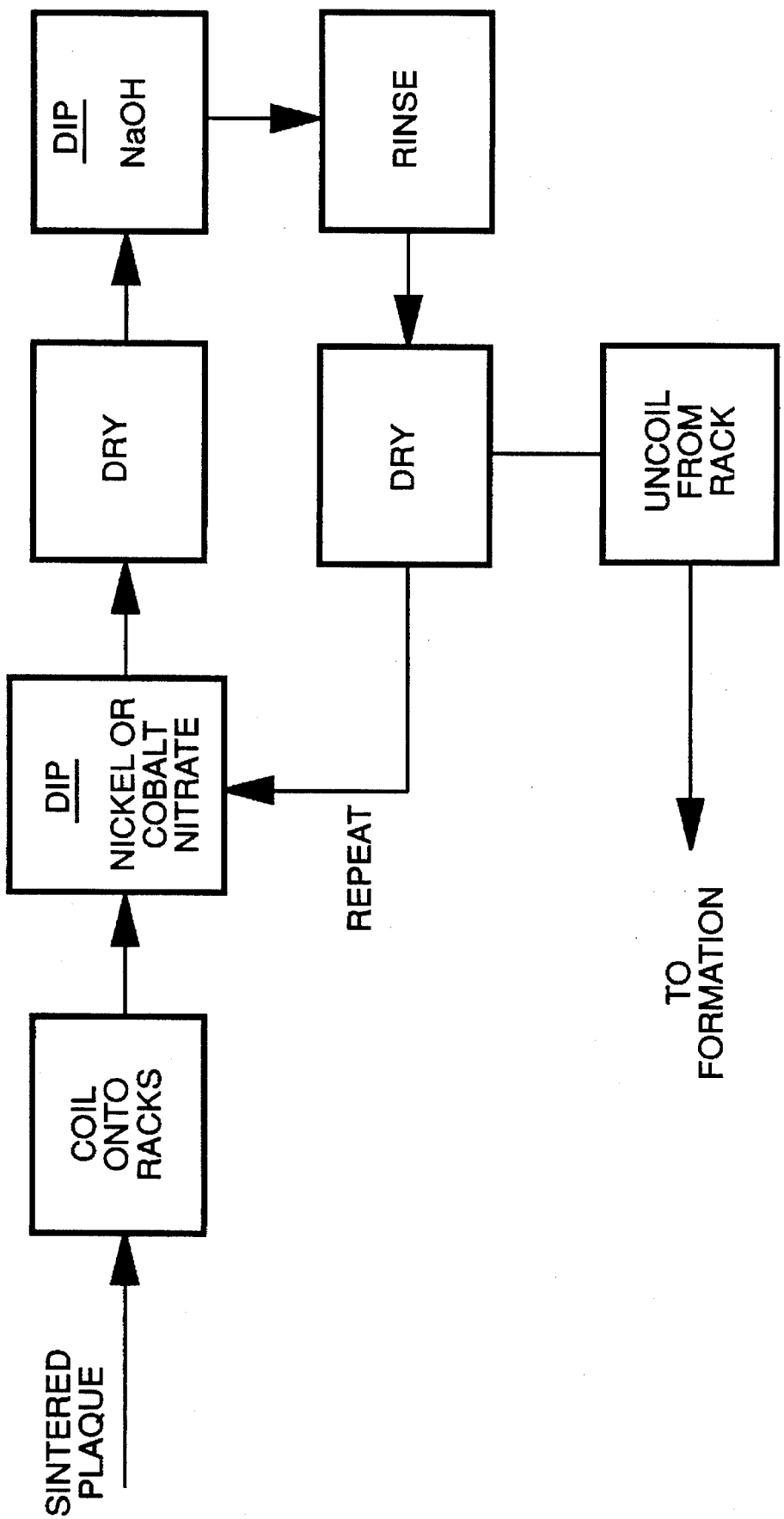
FIG. 2 is a schematic of the impregnation process.

The impregnation process of the present invention is schematically illustrated in FIG. 2. The sinter is coiled onto a rack and dipped into nickel nitrate or cobalt nitrate depending on the impregnation cycle. During the first impregnation cycle, a nickel nitrate dip, the sinter is dipped into 0.02N $HO_3$ in nickel nitrate (2.5M $Ni(NO_3)_2$) for 15 minutes. During the remainder of the impregnation cycles that use 0.02N $HO_3$ in nickel nitrate the sinter is dipped in 0.04N $HO_3$ in nickel nitrate (2.5M $Ni(NO_3)_2$) for 15 minutes. The nickel nitrate solutions are maintained at approximately 45° C. The reduced acid concentration on the first cycle acts to inhibit corrosion especially at the substrate/sinter interface. On subsequent dips, corrosion is minimized by the nickel hydroxide reaction product itself. Each of the two cobalt nitrate impregnation cycles are for 15 minutes. The cobalt nitrate solutions are maintained at approximately 20° C.

The dipped sinter is then dried until "bone dry". As used herein, "bone dry" means drying until no further weight loss occurs. The dipped sinter is usually bone dry after approximately 60 minutes at a temperature not higher than 80° F. It has been learned that higher drying temperatures were detrimental due to the formation of electrochemically inactive nickel oxide. Drying time is maintained at commercially practical level by an emphasis on the circulation of large air volume as opposed to higher temperature.

The bone dry sinter is then dipped in a 70° C., 30 wt %, solution of NaOH for approximately 15 minutes, preferable 19–21 minutes, most preferably 20 minutes.

Figure 3:
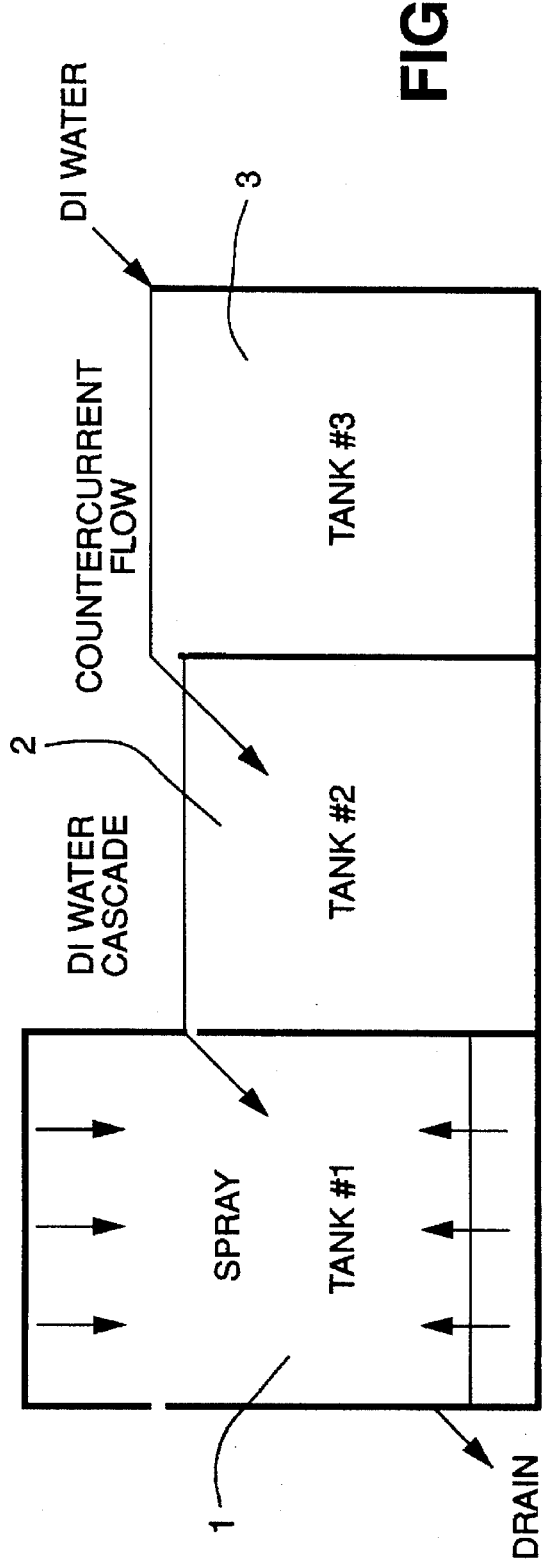
FIG. 3 is a cross sectional representation of the deionized water rinse system.

Following the NaOH dip, the sinter is rinsed using a three step deionized water rinse system as schematically diagrammed in FIG. 3, employing a spray tank 1, and two dip tanks 2, 3. The water in the spray tank 1 is the cascade overflow from dip tank 2, and the water in dip tank 2 is the cascade overflow from dip tank 3. The water in the spray tank 1 is drained off at a rate of 8–10 gpm, the same rate at which the deionized water is replenished to dip tank 3. The water in the spray tank 1 is sprayed from the top and bottom at the rate of approximately 100 gpm. The term "deionized water" as used herein refers to water having a maximum conductivity of 0.83 micro ohms, a minimum resistivity of 12,000 megaohms-cm, and a pH of from 4.5–7.5. The temperature of the water as it is added to dip tank 3 is approximately 70°–80° C. A sinter is rinsed in each rinsing station for approximately 60 minutes. We have discovered that a combination of spray/immersion is superior to either a total spray or total immersion system. The system of the present invention exploits the better quality rinse resulting from immersion and the efficiency of a spray to remove the initial NaOH quickly. After the completion of rinsing the sinter is again dried until bone dry. Impregnation cycles are repeated until the loading process is complete.

As previously mentioned, it is common in industry for the bottom material to be more heavily loaded than the top due to gravity. This is undesirable since loading is directly proportional to cell capacity and a low as possible capacity distribution is desirable. Some companies combat this problem by restacking racks at certain points in the dip process. An aspect of the present invention involves a far superior solution. In the present invention, a rack flip device is used to flip each impregnation rack so that the top of the rack becomes the bottom and the bottom becomes the top. This rotation takes only seconds, and the rack/flip device is easily incorporated into the processing line. Using the rack flip device after each impregnation cycle insures uniform loading which is vital for achieving a uniformly high capacity electrode.

Nitrate ions, as mentioned above, are generated in the electrode fabrication process of the present invention because of the use of nickel and cobalt nitrates. When a sinter is immersed in a nickel or cobalt nitrate solution it soaks up the solution into its pores. The subsequent drying step drives off the water and leaves behind nickel nitrate or cobalt nitrate salt in the pores. When the dry sinter is immersed in sodium hydroxide solution precipitation occurs. For nickel nitrate, for example, this precipitation can be expressed as follows:

$$Ni(NO_3)_2 + 2NaOH \rightarrow Ni(OH)_2 + 2NaNO_3$$

The nickel or cobalt hydroxide precipitate is held in the pores and on the surface of the nickel sinter and the sodium nitrate dissolves in the hydroxide. Some of the nitrate can remain occluded in the nickel hydroxide or cobalt hydroxide precipitate.

In prior art methods, the impregnated sinter inevitably retains small quantities of nitrate in spite of any subsequent rinsing operation. We have determined that the actual amount of nitrate held depends on the number of dips (the loading) and the amount of residual nitrates in the dip tanks and rinse water. In the present invention, the three part rinse following the NaOH dip removes nitrate residue and gives an active material filled only with nickel/cobalt hydroxides. However, it is now necessary to follow the rise of sodium nitrate in the alkali dip solution and also in the rinse water. Prior art methods that did not use as many impregnation cycles and/or the three part dip described above permit the concentration of nitrates to build up to levels sufficient to effect self discharge. Consequently, an aspect of the present invention monitors the nitrate ion level in the NaOH bath and when the level reaches a maximum of 30,000 ppm, the solution is replaced with fresh NaOH.

In addition, the formation process of the present invention removes nitrates that remain in the impregnated sinter. In addition, the formation process increases the surface area of the electrode and increases the electrolyte uptake for quicker activation. The formation process occurs after the nickel hydroxide has been deposited inside the pores in the sintering step and involves an electrochemical formation cycle that is a one cycle charge/discharge prior to the positive electrode material going into the battery. After the completion of the formation process, the amount of residual nitrates present is small, despite the fact the electrode is approximately 50% thicker and 10–15% heavier due to loaded active material, both factors that would contribute to higher levels of residual nitrate rather than lower levels. The effectiveness of the formation process is a result of high efficiency through 200% overcharge followed by complete discharge.

Figure 4:
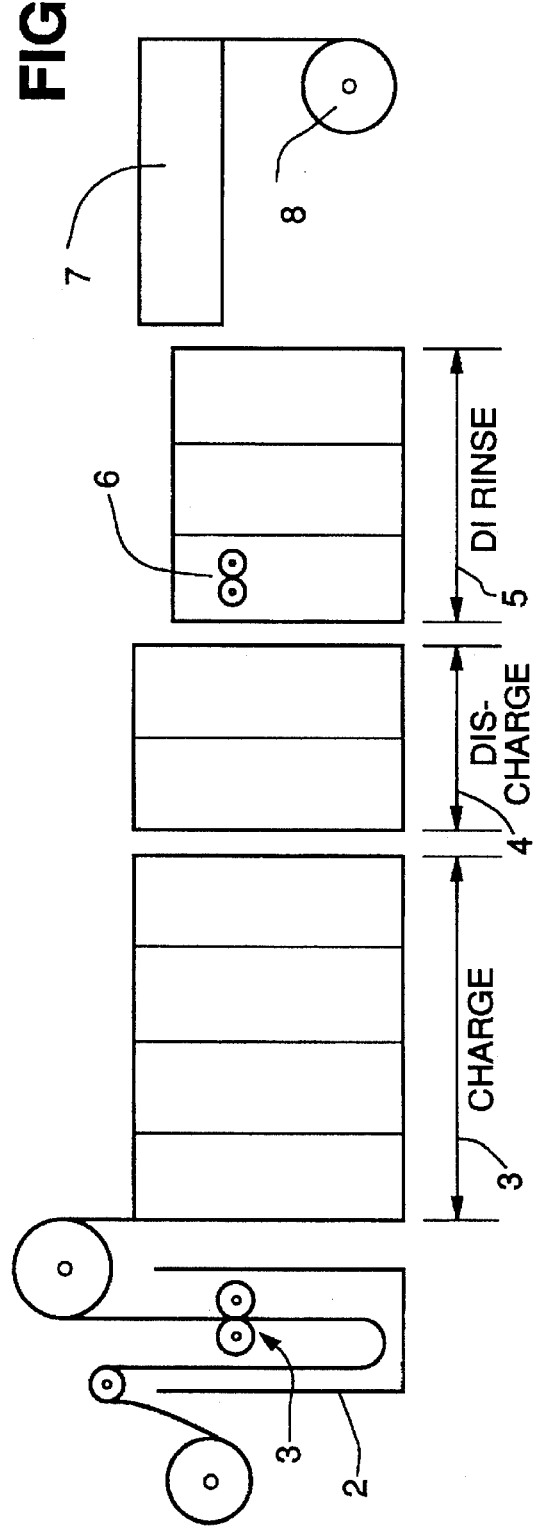
FIG. 4 is a cross sectional representation of the formation line.

FIG. 4 schematically illustrates the formation process of the present invention in which the impregnated sinter is formed into sintered positive electrode material. The formation process begins by winding impregnated sinter from the impregnation racks onto formation spools.

A formation spool 1 is fed into a presoak tank 2 containing NaOH electrolyte at 40°–50° C., preferably 45° C. We have found that the electrolyte absorbed by the electrode during the presoak greatly facilitates charge efficiency during the initial charging step. The electrode material is unwound from the formation spool 1 and fed past opposing brushes 3 to remove surface loading and loose particulates. The brushes have variable speed and pressure to allow adjustment for specific incoming material and conditions. The brushing step further facilitates electrolyte uptake by removing surface loading. In addition, brushing improves electrical contact between the material and contact rollers because it removes surface nickel hydroxide which has low conductivity.

Using a series of wetted contact rollers, the material is moved through a charge section 3. The charge section 3 consists of a series of tanks, preferably four tanks, containing electrolyte maintained at the same temperature as the presoak tank 2. A counter electrode is present in each tank of the charge section 3. The counter electrode is connected to the negative terminal of a power supply and the wetted contact rollers are connected to the positive terminal of the power supply.

The charge section is designed to provide 200% of the theoretical capacity of the material. However, no amount of charge input will be effective if it is not accepted by the active material. We have invented several innovative approaches to assure charge acceptance. As mentioned above, the use of a presoak tank and brushes improves electrolyte penetration. However, the solution itself is also important. It is common in industry to form in KOH rather than NaOH since KOH is used in the final cell for reasons of charge efficiency, temperature characteristics, cycle life, etc. Consequently, our discovery that NaOH is a more effective formation electrolyte is surprising. A related aspect of the present invention is the discovery that heating the NaOH to 45° C. rather than conventional formation at room temperature further accentuates the benefit. We have observed substantially higher capacity on the first cycle in the sealed cell when using NaOH at 45° C. to the degree that almost 100% of expected capacity is provided on the first cycle.

Still another aspect of the invention is a means to provide greater charge acceptance by an innovative counter electrode design which compensates for voltage drop across the electrode material. Normal formation uses a single flat plate counter electrode with terminal connections at the top of the bath. This is a problem in that the terminal connection of the material itself is the contact roller, which is also at the top to the bath. The resistance of the nickel electrode is substantial and over the entire length of the counter electrode, the voltage drop is significant. A conventional single plate counter electrode causes significant variances in the current density from the top to the bottom of the material. This situation results in most of the applied current being wasted on gas evolution instead of being used to charge the material. We confirmed this conclusion using static tests on the machine that showed the characteristic color change from green (nickel hydroxide) to black (nickel oxyhydroxide) occurred only in the upper 10% of the available charge section.

Our innovative solution to this problem was to break the single plate counter electrode into five segments, where each segment is separated by a resistor designed to match the voltage drop of the positive electrode material. This configuration provides a very uniform current density to the material, facilitating charge. This same approach facilitates discharge as well, and is repeated throughout the formation process.

The collective formation process provides electrodes having virtually a 100% real depth of discharge, greatly reduced levels of residual nitrates, increased surface area (which allows easy electrolyte uptake during cell fabrication as mentioned above), and yields cells that exhibit virtually 100% of their expected capacity even on their first cycle. As a further demonstration of the effectiveness of the described formation process, conventional Ni—Cd positive electrodes not sintered or impregnated in the manner described above yield cells having very high self-discharge. By making no change in the fabrication of such electrodes except to use the improved formation described above, self-discharge rates were reduced by 50%. Thus, the cells of the present invention have a self discharge in a sealed Ni—MH cell of $\leq 30\%$ in 30 days at 20° C.

The discharge section 4 of FIG. 4 is similar to the charge section 3. The discharge section 4, also consists of a series of tanks containing electrolyte at the same temperature as the presoak tank 2, counter electrodes, and wetted contact rollers. However, in the discharge section 4, it is necessary to have only two tanks because discharge is accepted at higher rates than charge, and only 100% of capacity is required to be removed, (unlike charge where 200% input is required and charging alone has "activated" the material). The counter electrodes are connected to the positive terminal of a power supply, and the wetted contact rollers are connected to the negative terminal of the power supply. The object of the discharge section 4 is to remove all of the charge provided in the charge section 3. Since not all electrode material has identical capacity, the discharge section is designed to provide approximately 6% overdischarge (on average) in order to ensure that all material is fully discharged. Generally, nominally overcharged material has a characteristic "grayish" color.

The rinse 5 of the formation process preferably uses three tanks of deionized water having a countercurrent flow rate of 3–5 gpm and an initial temperature of 75°–85° C. Brushes 6 may optionally be present in at least one of the rinse tanks to remove surface loading and particulate matter.

The dryer 7 must be capable of drying the material until it is bone dry. Any kind of appropriate dryer may be used such as an infrared dryer.

Finished positive electrode material is taken up on the take up spool 8.

The multiple impregnation cycles of the present invention result in spatial and orientational placement of similar or dissimilar atoms or groups of atoms that produce qualitatively new performance levels for sintered positive electrodes. The multiple impregnation cycles of the present invention result in a disordered multicomponent material comprising a nickel hydroxide host matrix into which cobalt is incorporated as a modifier in a manner similar to the negative alloy disordered materials described above. The disordered positive alloy materials of the present invention do not have periodic local order.

By forming nickel hydroxide positive electrodes that are disordered materials, we have greatly increased the porosity and performance of these electrodes. Generally, the improved characteristics of these alloys result from tailoring the local chemical order and hence the local structural order by the incorporation of at least one modifier, most preferably three modifiers, chosen from the group consisting of F, Li, Na, K, Mg, Ba, Ln, Se, Nd, Pr, Y, Co, Zn, Al, Cr, Mn, Fe, Cu, Zn, Sc, Sn, Sb, Te, Bi, Ru, and Pb. Like the metal hydride negative alloys discussed above, disordered positive electrode materials have a substantially increased density of catalytically active sites and storage sites compared to the prior art single or multi-phase crystalline materials. These additional sites are responsible for improved efficiency of electrochemical charging/discharging and an increase in electrical energy storage capacity.

The choice of disordered materials has fundamental scientific advantages: as seen, a substantial number of elements can be included in the list of candidates for electrodes. These elements offer a variety of bonding possibilities due to the multi-directionality of d-orbitals, and less so due to f-orbitals which, although extending in still more directions than d-orbitals, are closer to the nucleus of the metal atom and, hence, less accessible.

Where prior art sintered electrode materials had an energy density of only around 500 mAh/cc, the materials of the present invention have an energy density of $\geq 560$ mAh/cc, preferably 600 mAh/cc.

The present invention is explained further in the following non-limiting Examples.

EXAMPLES

TABLE 1

SLURRY FORMULATION

| | quantity in kg |
|---|---|
| Nickel Powder | 54.9 |
| Water | 58.5 |
| carboxy methyl cellulose | .626 |
| methyl cellulose | .478 |
| Polyox ® | .956 |
| total | 115.46 |

A slurry was prepared using nickel powder, water, carboxy methyl cellulose binder, methyl cellulose binder, and POLYOX® poly(ethylene oxide) polymer in the quantities indicated in Table 1.

All the materials except water were added to a mixing drum which was rotated for thirty minutes at 2 rpm. Water was then added and mixed in with a stirring rod to remove air and reduce lumps to less than 0.5 inches in diameter. The drum was again sealed and mixed at 2 rpm. After 48 hours, the density of the resulting slurry was checked and any visible lumps broken. Viscosity was adjusted to 72,000 Centipoise (cp) (+/–4,000 cp) and density to 1.68 g/cc (+/–0.03 g/cc).

Sintering took place in a five zone furnace with each zone set at approximately 910° C. Prior to sintering, the slurry was doctor bladed onto a preoxidized perforated solid nickel substrate and dried in a two zone drying tower at temperatures of 107° C. and 88° C. The air flow was maintained at 5 SCFM. Drying took place under a 7% hydrogen, 93% nitrogen atmosphere. The physical parameters of these materials at this point are shown in Table 2.

TABLE 2

| | after drying tower | after sintering | after doctor blade |
|---|---|---|---|
| thickness (in) | 0.094 | 0.045 | 0.036 |
| area weight (g/in$^2$) | 2.21 | 1.241 | 1.18 |
| Density (g/in$^3$) | 23.5 | 27.6 | 32.6 |

Sintered material was then coiled on impregnation racks. The impregnation process involved 14 individual impregnation cycles. Each impregnation cycle involved a nitrate dip in nickel or cobalt nitrate, drying, a alkaline dip in NaOH, rinsing, and drying.

The nitrate dip of impregnation cycle 1 was in 0.02N HO$_3$ in 2.5M Ni(NO$_3$)$_2$ hexahydrate for 20 minutes. The nitrate dips for impregnation cycles 6 and 14 were in cobalt nitrate hexahydrate for 20 minutes. The nitrate dips for all other impregnation cycles used 0.4N HO$_3$ in 2.5M Ni(NO$_3$)$_2$ hexahydrate for 15 minutes.

For each impregnation cycle, following the nitrate dip in the appropriate nitrate solution, the impregnation rack was lifted out of the solution and allowed to drip dry for 30 minutes. The rack was then placed in a forced air recirculation dryer at 80° C. for 60 minutes where the dryer had a flow rate of 2,000 ft$^2$/minute.

Rinsing following the nitrate dip, was done in a three tank system having a counter current flow from tank 3 to 2 to 1. Tank 1 was a spray rinse and tanks 2 and 3 were immersion rinses. Deionized water was used throughout.

Following the final impregnation cycle, impregnated positive material was uncoiled from the impregnation racks and coiled onto formation spools. The material was then fed continuously at a rate of 8"/minute into the formation machine. In the formation machine the formation spools were placed in a presoak tank containing 30% NaOH electrolyte at 45° C. The material was then fed from the formation spools through opposing nylon brushes (to remove surface loading and loose particulates), and into a charge section.

The charge section consisted of four tanks containing counter electrodes and contact rollers. In the charge section, the contact rollers were connected to the positive terminal of a power supply while counter electrodes were connected to the negative terminal. This section provided the electrode material with at least 90% of its theoretical state of charge in order to encourage electrolyte absorption and cell capacity, as well as to remove electrochemically inactive charge reserve. Electrolyte in the charge section was maintained at a temperature of 45° C. to assist the charging reaction efficiency. Also, the electrolyte was recirculated and sprayed onto the contact rollers and tension on the belt of the material was kept high in order to provide optimal conductivity between the rollers and the material.

The material was then passed into a discharge section consisting of two tanks where it received approximately a 6% overdischarge, on an average, in order to insure that all material was fully discharged.

The material was then rinsed using deionized water and nylon brushes.

Finally, the material was dried using an infrared heater. The resulting positive electrode belt was slit, punched, cut to length, and fabricated into standard positive electrodes.

Ni—MH negative electrode material having the following composition $$V_{18}Ti_{15}Zr_{18}Ni_{29}Cr_5Co_7Mn_8$$

was fabricated into negative electrodes as described in copending U.S. application Ser. No. 07/879,823 the contents of which are incorporated by reference.

Standard nickel cadmium negative electrode materials were fabricated as described in Falk and Salkind, Alkaline Storage Batteries (1969).

Prepared negative electrodes, separator, nickel hydroxide positive electrodes of the present invention, and 30% KOH electrolyte were assembled into "C" cells as described in detail in U.S. patent application Ser. No. 07/879,823. The specific negative electrode, separator, and positive electrode used in each cell is indicated in Table 3, below. The finished cells were subjected to charging and discharging conditions and their charge retention determined as indicated in Table 3.

TABLE 3

| positive alloy | negative alloy | separator | charge retention @C rate to 1.0 V | |
|---|---|---|---|---|
| | | | 3 days | 14 days |
| I-pos | Ni-MH | treated pp | 92 | 79 |
| I-pos | Ni-MH | pp | 83 | 62 |
| I-pos | Ni-MH | nylon | 81 | 52 |
| S-pos | Ni-MH | treated pp | 88 | 67 |
| S-pos | Ni-MH | pp | 78 | 42 |
| S-pos | Ni-MH | nylon | 76 | 39 |

"Ni-MH" stands for a Ni-MH alloy having the composition $V_{18}Ti_{15}Zr_{18}Ni_{29}Cr_5Co_7Mn_8$;
"I-pos" electrodes are positive electrodes fabricated according to the present invention;
"S-pos" electrodes are standard, prior art, positive electrodes;
"nylon" separators are standard nylon separators;
"pp" separators are standard untreated polypropylene separators; and
"treated pp" separators are radiation grafted polypropylene separators as described in detail in U.S. Pat. application No. 07/879,823.

It is obvious to those skilled in the art that the positive electrode materials of the present invention may be prepared by additional methods without departing from spirit and scope of the present invention.

The drawings, discussion, descriptions, and examples of this specification are merely illustrative of particular embodiments of the invention and are not meant as limitations upon its practice. It is the following claims, including all equivalents, that define the scope of the invention.

What is claimed is:

1. A positive electrode for use in alkaline rechargeable electrochemical cells comprising:

a material comprising a compositionally and structurally disordered multiphase nickel hydroxide host matrix which includes at least one modifier chosen from the group consisting of F, Li, Na, K, Mg, Ba, Ln, Se, Nd, Pr, Y, Co, Zn, Al, Cr, Mn, Fe, Cu, Zn, Sc, Sn, Sb, Te, Bi, Ru, and Pb.

2. The positive electrode as claimed in claim 1, comprising at least three modifiers chosen from the group consisting of F, Li, Na, K, Mg, Ba, Ln, Se, Nd, Pr, Y, Co, Zn, Al, Cr, Mn, Fe, Cu, Zn, Sc, Sn, Sb, Te, Bi, Ru, and Pb.

3. The positive electrode as claimed in claim 1 for use with V—Ti—Zr—Ni metal hydride alloy rechargeable electrochemical cells.

4. The positive electrode as claimed in claim 1 for use with V—Ti—Zr—Ni metal hydride alloy rechargeable electrochemical cells wherein said positive electrode further comprises a sintered nickel hydroxide electrode lacking cadmium and having a cycle life of ≧500 cycles.

5. The positive electrode as claimed in claim 1 for use with V—Ti—Zr—Ni metal hydride alloy rechargeable electrochemical cells wherein said positive electrode further comprises a sintered nickel hydroxide electrode lacking cadmium and having an energy density of ≧560 mAh/cc, a cycle life of ≧500 cycles, and a self discharge in a sealed Ni—MH cell of ≦30% in 30 days at 20° C.

6. The positive electrode claimed in claim 5, wherein residual nitrates are present in an amount less than 200 ppm.

7. The positive electrode claimed in claim 5, wherein said energy density is greater than 600 mAh/cc.

8. The positive electrode claimed in claim 5, comprising a sintered electrode material having pores approximately 30 microns in size.

9. The positive electrode claimed in claim 8, wherein the overall porosity of said sintered electrode material is around 80%.

10. The positive electrode claimed in claim 5, wherein said positive electrode contains greater than 6 wt % coprecipitated cobalt.

11. The positive electrode claimed in claim 5, wherein said positive electrode contains 9–10 wt % coprecipitated cobalt.

* * * * *